United States Patent [19]

Lee

[11] Patent Number: 4,961,374
[45] Date of Patent: Oct. 9, 1990

[54] JUICER

[76] Inventor: Ming-Hsiang Lee, No. 2, Hsin-Jen Rd., Tainan City, Taiwan

[21] Appl. No.: 493,366

[22] Filed: Mar. 14, 1990

[51] Int. Cl.$^5$ .............................................. A23N 1/00
[52] U.S. Cl. ....................................... 99/507; 99/508; 100/98 R; 100/213
[58] Field of Search ................ 99/495, 496, 501, 504, 99/505, 506–508, 509, 510, 513; 100/98 R, 213, 107, 108, 37, 39; D7/48, 49

[56] References Cited

U.S. PATENT DOCUMENTS

| | | | |
|---|---|---|---|
| 1,115,754 | 11/1914 | Walker | 99/508 |
| 2,090,913 | 8/1937 | Johnson | 100/213 |
| 2,160,523 | 5/1939 | Scurlock | 99/508 |
| 2,177,939 | 10/1939 | Johnson | 100/213 |
| 2,220,372 | 11/1940 | Johnson | 100/213 |
| 2,506,970 | 5/1950 | Paul | 99/507 |
| 2,553,942 | 5/1951 | Roos | 99/504 |
| 3,203,343 | 8/1965 | Myers | 100/98 R |

FOREIGN PATENT DOCUMENTS 295395 4/1932 Italy ....................... 99/507

Primary Examiner—Timothy F. Simone

[57] ABSTRACT

In a juicer, a level has a shaft member inserted into a horizontal cylindrical mounting member formed on the top of a support body and a prolonged radial lever arm whose terminating end can be turned to below the bottom end of the support body. An annular partition plate is fixed in the cylindrical mounting member and a locking sleeve is fitted in the partition plate. The locking sleeve has radial flanges to abut with the partition plate so that the locking sleeve does not move away from the partition plate when it is moved axially. However, a notch is provided in the partition plate at a predetermined position to permit one of the radial flanges to pass therethrough. The lever shaft which carries a gear is inserted into the locking sleeve. A rack is connected to a pressing member and inserted into the support body, engaging with the gear. The rack can be easily drawn out of the support body for cleaning when the lever arm is turned to below the bottom end of the support body. The lever can be removed from the support body when the radial flange of the locking sleeve is in alignment with the notch of the partition plate.

4 Claims, 6 Drawing Sheets

JUICER

BACKGROUND OF THE PRESENT INVENTION

This invention relates to a juicer, and particularly to a juicer with an improved arrangement for mounting an operating lever thereof.

Referring to FIG. 1, a known juicer is shown having an upright body 11, a collecting tray 12 attached to the upper part of the upright body 11, a cone-shaped lower bearing member 13 provided on the collecting tray 12, a cone-shaped upper bearing member 15 which is provided above the lower bearing member 13 and attached to a bowl-shaped pressure member 14 which in turn is mounted movably on the the top of the upright body 11 by means of a rack member 16. The rack member 16 extends into the upright hollow body 11 from the pressure member 14 through a conduit member 112. Two parallel brackets 17A and 17B project from the inner side of the top of the hollow body 11. A lever 18 is attached to the hollow body 11 by means of its shaft 181 which passes through holes 113 of the hollow body and holes 171, 172 of the brackets 17A, 17B. A transverse spring clip A clamps the end of the shaft 181 and is engaged with an annular groove 183 of the shaft 181 adjacent to one of the brackets 17B. A gear 19 is mounted on the shaft 181 of the lever 18 and is arranged between the brackets 17A, 17B so as to engage with the gear 19. The juicer has a disadvantage in that the rack member cannot be removed easily from the hollow body without detaching the lever when it is necessary to clean the juice staining the rack member because the projecting bottom portion 161 of the rack does not allow the rack to disengage from the gear. To detach the lever from the brackets and the hollow body, the locking spring clip A must be first removed from the shaft of the lever. Since the spring clip A is placed in a limited space inside the hollow body, it is inconvenient to detach the clip A. Moreover, the assembly of the lever of this juicer is difficult because it involves the use of the spring clip A.

SUMMARY OF THE INVENTION

An object of the present invention is to provide a juicer whose rack member and lever can be attached to or detached easily from the support body of the juicer.

Another object of the invention is to provide a juicer with an improved lever mounting mechanism which can effectively prevent the lever from being accidentally released from the support body of the juicer.

According to the invention, a juicer comprises a hollow support body, a collecting tray held by the support body adjacent to the top end of the support body, a cone-shaped lower bearing member provided on the collecting tray, a rack member having a plurality of teeth, vertically movably disposed in the hollow support body, a pressing member attached to the top end of the rack member and extending over the lower bearing member, a cone-shaped upper bearing member attached to the pressing member so as to move towards and away from the lower pressing member and having a confronting conical surface relative to the lower pressing member, a lever having a horizontal shaft member mounted to the hollow support body and a lever arm extending radially from the horizontal shaft member, a gear mounted on the horizontal shaft member and engaged with the rack member, and improvements which comprise:

a horizontal hollow cylindrical mounting member formed on the top end of the hollow body;

an annular partition plate fixed in the hollow cylindrical mounting member adjacent to a first end of the cylindrical mounting member and having an inner periphery defining a central through-hole and a notch extending radially downward from the inner periphery;

the horizontal shaft member entering the hollow cylindrical mounting member through a second end of the cylindrical mounting member and then passing through the central through-hole;

a locking sleeve member provided fixedly on the hollow cylindrical shaft member and fitted in the central through-hole, the locking sleeve member having a first radial flange and a second radial flange extending respectively on two sides of the annular partition plate, both first and second radial flanges having terminating ends a the positions outwardly of the inner periphery of the annular partition plate, the second radial flange being capable of passing through the annular partition plate when in alignment with the notch;

the gear being mounted on the horizontal shaft member between the lever arm and the locking sleeve member;

the lever arm having a terminating end, the terminating end having a length, from the horizontal shaft member, which is longer than the length from the horizontal shaft member to the bottom end of the hollow support body, and the rack member further having a longitudinal flat release face extending from the teeth to the bottom end of the rack member, the flat release face being in a plane inwardly of the teeth.

In one aspect of the invention, the hollow support body further has a cylindrical container formed integrally therewith at the front side thereof, and the collecting tray rests on the cylindrical container.

The exemplary preferred embodiment will be described in detail with reference to the accompanying drawings, in which:

DETAILED DESCRIPTION OF THE PREFERRED EMBODIMENT

Figure 1:
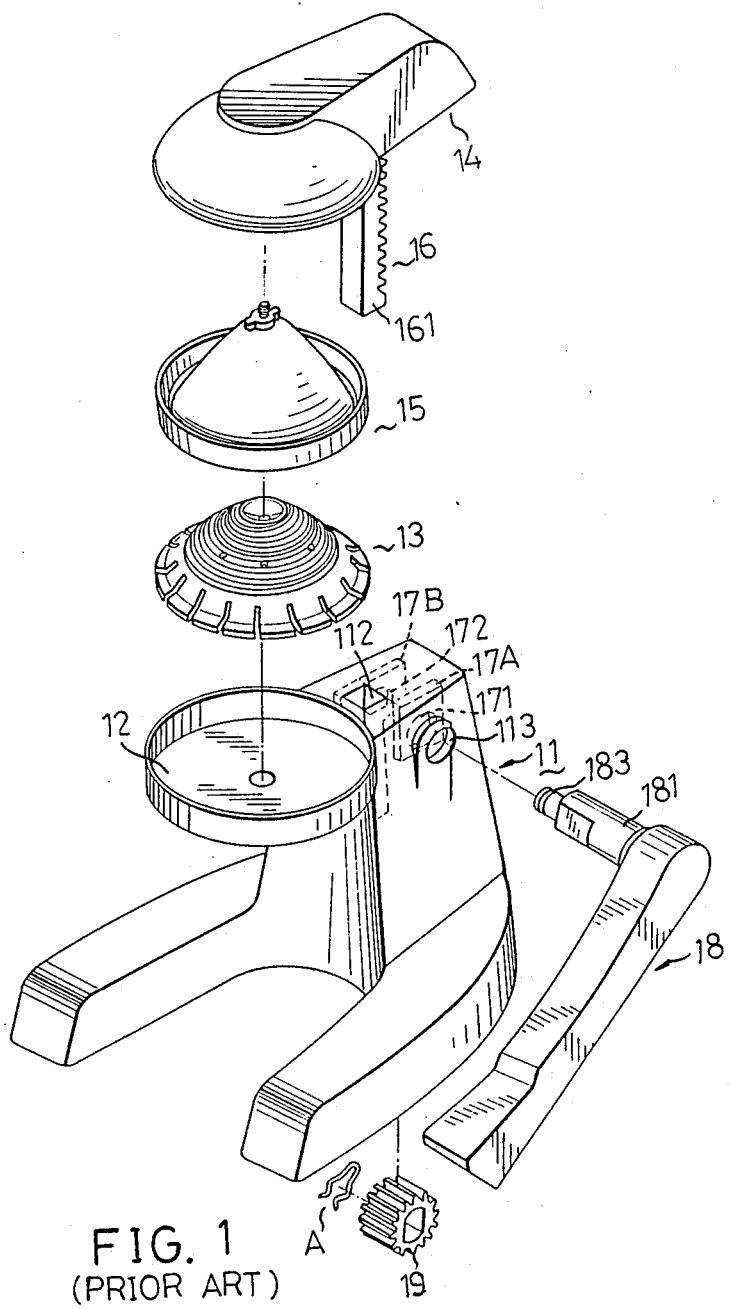
FIGS. 1, 2 and 3 show a juicer of the prior art.
Figure 3:
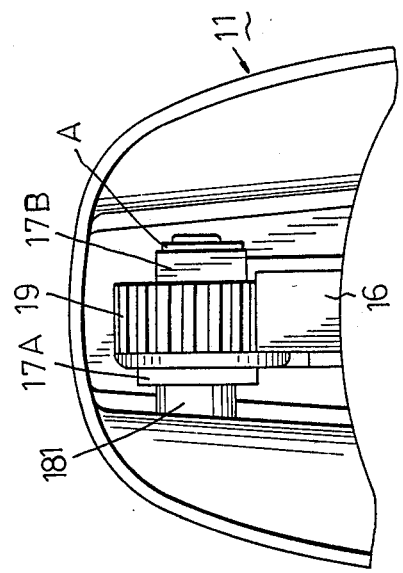
Figure 2:
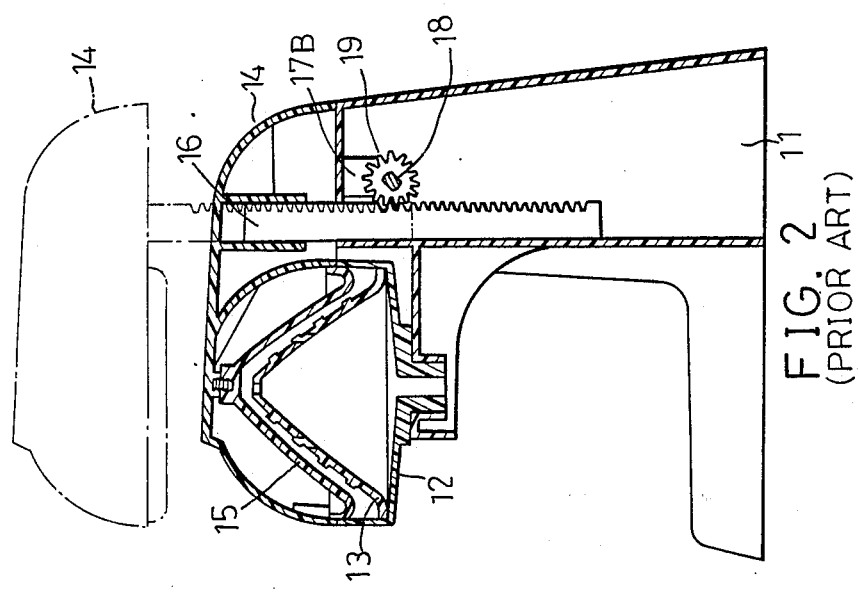
Figure 4:
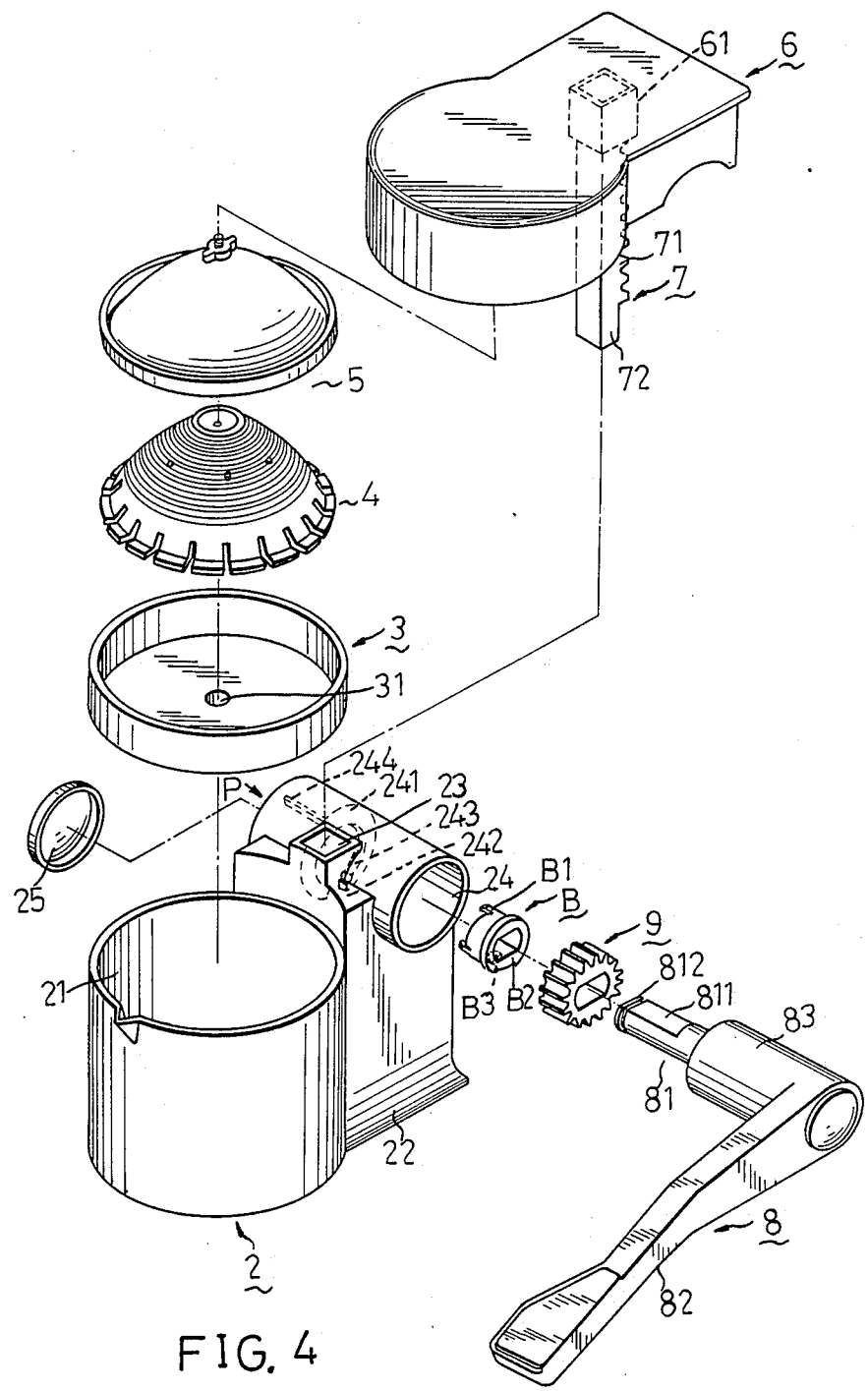
FIG. 4 is a exploded view of a juicer according to the present invention.

Referring to FIG. 4, a juicer embodying the present invention includes an upright body 2, a collecting tray 3, a cone-shaped lower bearing member, a cone-shaped upper bearing member 5, a cap-like pressing member 6, a rack member 7, a lever 8, a gear 9 and a locking sleeve member B.

The upright hollow body 2 is a one-piece molded plastic body and has a front cup member 21 for receiving juice and a hollow support member 22 at the rear side of the cup body 21. A horizontal hollow cylindrical mounting member 24 is formed at the top of the hollow support member 22. The hollow support member 22 further has an upward projecting conduit member 23 which is adjacent to and communicated with the horizontal hollow cylindrical member 24. A cap 25 is provided at one end of the hollow cylindrical mounting member 24.

Figure 6:
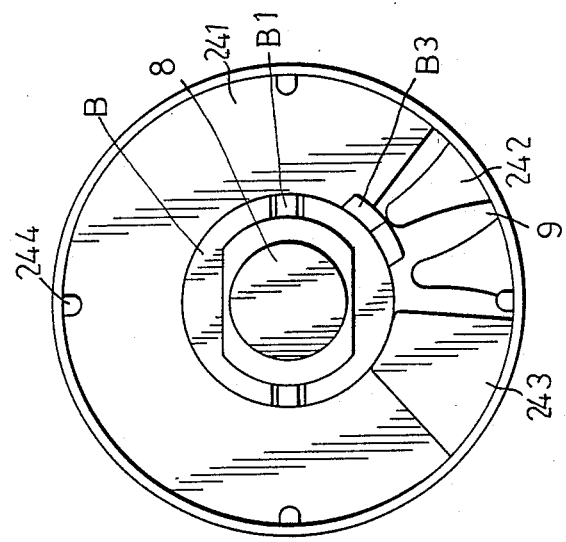
FIG. 6 is an elevation view showing that the locking sleeve member is placed in the other position by turning the lever forward.
Figure 5:
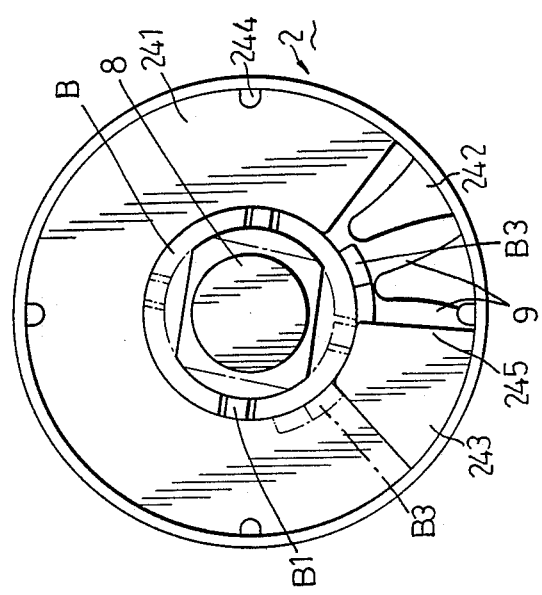
FIG. 5 is an elevation view of the hollow cylindrical mounting member, viewed in the direction of P in FIG. 4, with the locking sleeve member being placed in a particular position by turning the lever rearward.

Referring to FIG. 4 in combination with FIGS. 5 and 6, the hollow cylindrical mounting member 24 has an interior annular partition member 241 which define a central through-hole. The annular partition member 241 further has a notch 242 in the shape of a segment of an annulus, which extends downward from an inner periphery of the partition member. A stop member or a raised part 243 projects from one side the annular partition member 241 which faces the cap 25 and extends radially adjacent to an edge 245 of the partition member 241. A plurality of ridges 244 are provided axially on the inner surface of the hollow cylindrical mounting member 24 to restrict the inward movement of the cap 25.

The collecting tray 3 rests on the top of the cup body 2 and is provided with an outlet hole 31. The lower bearing member 4 is provided on the collecting tray 3 to hold a fruit whose juice is to be squeezed out. The cone-shaped upper bearing member 5 is screwed to a front portion of the pressing member 6. A connecting sleeve 61 is formed at the bottom side of the rear portion of the pressing member and holding the rack member 7.

The rack member 7 is inserted into the hollow support body through the conduit member 23. The rack member 7 has a plurality of rack teeth 71 arranged longitudinally and a flat face 72 below the rack teeth 71 which extends to the bottom end of the rack member 7. The flat face 72 allows the gear 9 which engages with the rack teeth 7 to be released from the rack teeth 71.

The lever 8 has a cylindrical portion 83 inserted into the hollow cylindrical mounting member 24 and a shaft portion 81 with a portion 811 having a segment-shaped cross-section. A lever arm 82 is provided at the outer end of the cylindrical portion 83 and a peripheral groove 812 is provided at the inner end of the shaft portion 81. The length of the lever arm 82 is arranged to be longer than the distance from the shaft 81 to the bottom end of the hollow support body 22.

The gear 9 is sleeved onto the the shaft portion 81 and engaged with the rack member 7. In addition, a locking sleeve member B is sleeved to the shaft portion 81 adjacent to the gear 9. The locking sleeve member B is fitted in the central through-hole of the partition member 241. A first radial flange in the form of an annular flange B2 and a second radial flange B3 having a cross-section in the shape of a segmented annulus project from the periphery of the locking sleeve respectively on two sides of the annular partition plate 241. Since the ends of both first and second radial flanges B2, B3 extend to a position outwardly of the inner periphery of the annular partition plate 241, the locking sleeve member B can be prevented from being released from the partition plate 241. However, when the second radial flange is aligned with the notch 242, the locking sleeve member B can be removed from the partition plate member 241 by drawing out the shaft portion 81. The locking sleeve member B further has two snap projections B1 which extend axially and inwardly from one end thereof and engage with the peripheral engaging groove 812 of the shaft portion 81.

Figure 7:
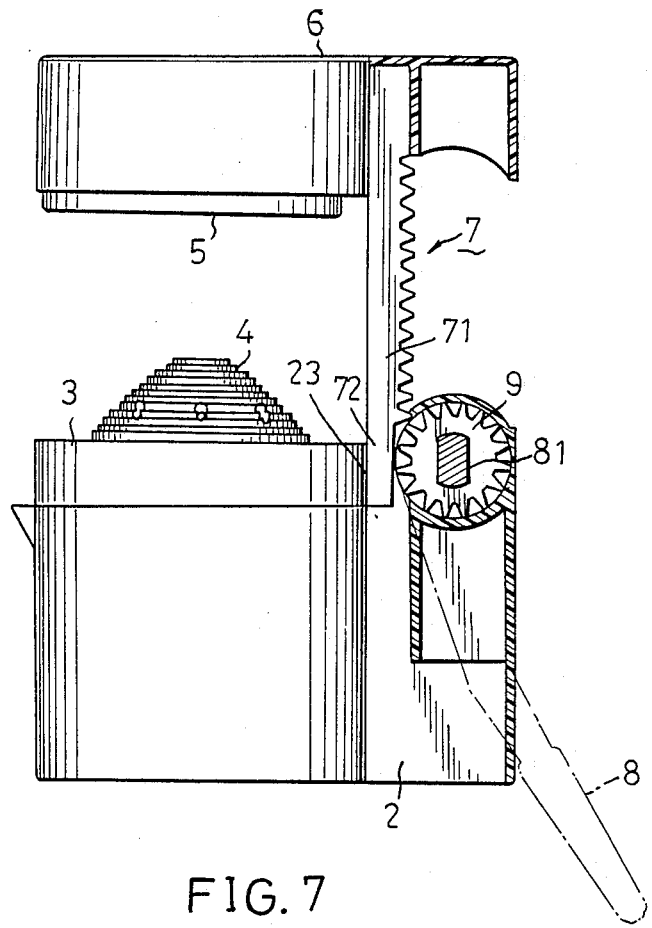
FIG. 7 is a side view of the juicer of FIG. 4 wherein the rack disengages from the gear.

In assembly, the gear 9 and the locking sleeve member B are attached to the shaft portion 81 of the lever 8 and, then, the shaft portion is inserted into the hollow cylindrical mounting member 24 until the locking sleeve member B passes through the annular partition member 241. It is to be noted that the lever 8 must be placed in a right position so as to align the radial flange B3 of the locking sleeve member B and the notch 242 of the partition plate member 241 when pushing the locking sleeve member B to pass through the annular partition plate member 241. In order to place the lever 8 in a right position, the body 2 must be placed on a table or the like, then moved to the edge of the table and the lever arm 82 is turned downward to below the supporting face of the table as shown in FIG. 7. After the locking sleeve member B passes through the partition plate 241, the rack is inserted into the hollow body through the conduit member 23 and the lever arm is turned to lower the rack member.

Figure 9:
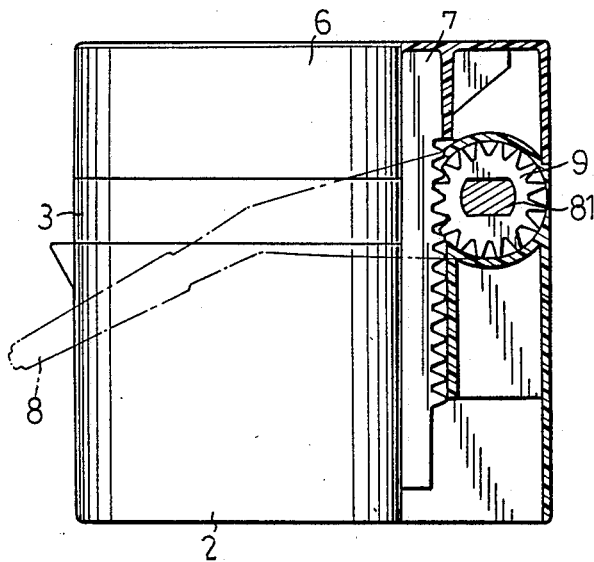
FIG. 9 is a side view of the juicer wherein the lever is turned forward.
Figure 8:
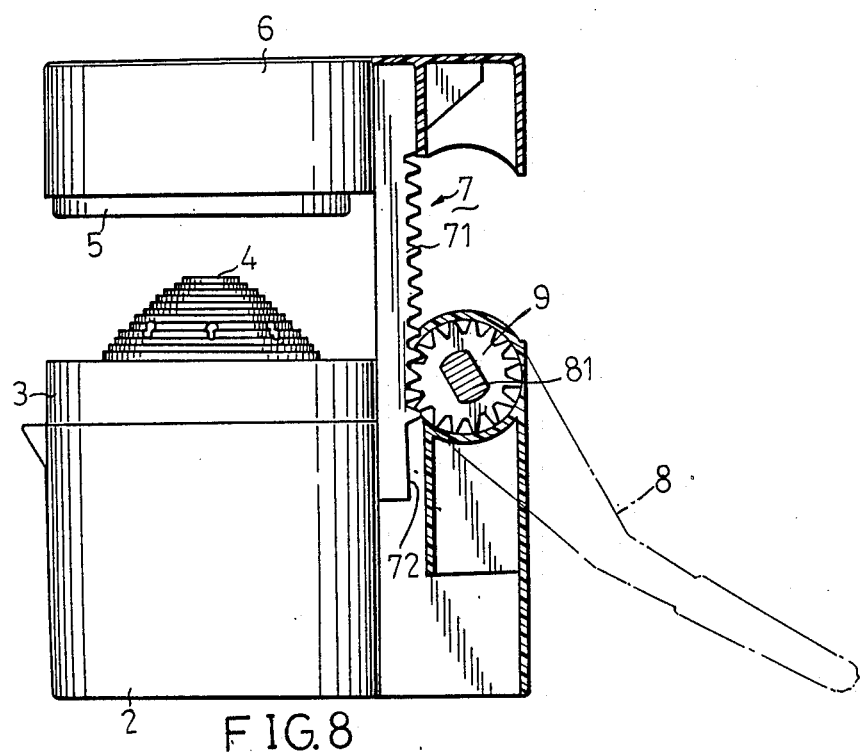
FIG. 8 is a side view of the juicer wherein the lever is turned rearward.

Either lever 8 or rack member 7 can not escape from the hollow body 22 after assembly. The reasons are that: (1) the lever arm 82 is restricted from continued rotation when it is turned rearward to a position, as shown in FIG. 8 because the terminating end of the lever arm 82 rests on the surface of a table or the like, so that the radial flange B3 cannot move to the notch 242 of the partition plate 241 and the flat face 72 of the rack 7 cannot move to the gear 9; and (2) when the lever is turned forward, the lower and upper bearing members 4 and 5 contact against one another as shown in FIG. 9, thereby stopping the rotation of the lever, placing the radial flange B3 of the locking sleeve member B at the position, shown in FIG. 6, which prevents the radial flange B3 from passing through the notch 242.

However, the rack member 7 can be removed easily from the body 22, when the lever arm 82 is turned to a position below the bottom end of the support body 2, as shown in FIG. 7. In this situation, the flat face 72 reaches the gear 9 and permits the rack member 7 to be drawn out easily, but, the radial flange B3 of the locking sleeve member B is stopped by the stop member 243 of the annular partition plate 241 as shown in FIG. 5 so that the radial flange B3 does not move to the notch 242.

The lever 8 can be detached from the hollow body 22 only after the rack member is removed and the lever is turned forward and downward to release the radial flange B3 through the notch 242.

With the invention thus explained, it is apparent that various modifications and variations can be made without departing from the scope of the invention. It is therefore intended that the invention be limited only as indicated in the appended claims.

I claim:

1. A juicer comprising:
   a hollow support body having a front side, a top end and a bottom end;
   a collecting tray held by said support body adjacent to said top end;
   a cone-shaped lower bearing member provided on said collecting tray;
   a rack member having a top end, a bottom end and a plurality of teeth between said top and bottom ends, said rack member vertically disposed in said hollow support body and being movable outward or inward;

a pressing member attached to said top end of said rack member and extending over said lower bearing member;

a cone-shaped upper bearing member attached to said pressing member so as to move towards and away from said lower pressing member and having a confronting conical surface relative to said lower pressing member;

a lever having a horizontal shaft member mounted to said hollow support body and a lever arm extending radially from said horizontal shaft member;

a gear mounted on said horizontal shaft member and engaged with said rack member; and improvements which comprise:

a hollow cylindrical mounting member with a horizontal axis formed on said top end of said hollow body and having a first end and an opposite second end;

an annular partition plate fixed in said hollow cylindrical mounting member adjacent to said first end and having an inner periphery defining a central through-hole and a notch extending radially downward from said inner periphery, said horizontal shaft member entering said hollow cylindrical mounting member through said second end and then passing through said central through-hole, a locking sleeve member provided fixedly on said hollow cylindrical shaft member and fitted in said central through-hole, said locking sleeve member having a first radial flange and a second radial flange extending respectively on two sides of said annular partition plate, both said first and second radial flanges having terminating ends at the positions outwardly of said inner periphery of said annular partition plate, said second radial flange being capable of passing through said annular partition plate when in alignment with said notch;

said gear being mounted on said horizontal shaft member between said lever arm and said locking sleeve member;

said lever arm having a terminating end, said terminating end having a length, from said horizontal shaft member, which is longer than the length from said horizontal shaft member to said bottom end of said hollow support body, and said rack member further having a longitudinal flat release face extending from said teeth to said bottom end of said rack member, said flat release face being in a plane inwardly of said teeth.

2. A juicer as claimed in claim 1, wherein said hollow support body further has a conduit-like projection formed at said top end of said hollow support body adjacent said hollow cylindrical mounting member and communicated with said conduit-like projection, said conduit-like projection surrounding and guiding said rack member.

3. A juicer as claimed in claim 1, wherein said notch is in the form of a segment of an annulus, and said second radial flange has a cross-section having the shape of a segment of an annulus.

4. A juicer as claimed in claim 1, wherein said hollow support body further has a cylindrical container formed integrally therewith at said front side thereof, said collecting tray resting on said cylindrical container.

* * * * *